United States Patent [19]

Buschmann et al.

[11] 4,377,414
[45] Mar. 22, 1983

[54] SHAPED CEMENTITIOUS PRODUCTS

[75] Inventors: John C. Buschmann, Columbia, Md.; Elizabeth L. Rasmussen, Hoth, Denmark; William C. Webster, Norristown, Pa.; Preston L. Veltman, Severna Park, Md.

[73] Assignee: A/S Niro Atomizer, Denmark

[21] Appl. No.: 184,069

[22] Filed: Sep. 4, 1980

[51] Int. Cl.$^3$ .................................................. C04B 1/00
[52] U.S. Cl. ........................................ 106/85; 106/97; 106/105; 106/109; 106/118
[58] Field of Search .................. 106/89, 97, DIG. 1, 106/85, 105, 109, 118, 121; 423/244

[56] References Cited

U.S. PATENT DOCUMENTS

| | | | |
|---|---|---|---|
| Re. 29,783 | 9/1978 | Smith et al. | 106/109 |
| 1,942,769 | 1/1934 | Peffer et al. | 106/DIG. 1 |
| 2,382,155 | 8/1945 | Jones et al. | 106/118 |
| 2,803,556 | 8/1957 | Carlsson et al. | 106/98 |
| 2,948,948 | 8/1960 | Duplin et al. | 106/DIG. 1 |
| 2,987,408 | 6/1961 | Minnick | 106/97 |
| 2,987,411 | 6/1961 | Minnick | 106/288 B |
| 3,076,717 | 2/1963 | Minnick | 106/118 |
| 3,192,060 | 6/1965 | Tilsen | 106/97 |
| 3,206,319 | 9/1965 | Minnick et al. | 106/119 |
| 3,230,103 | 1/1966 | Minnick | 106/117 |
| 3,341,341 | 9/1967 | Corson et al. | 106/98 |
| 3,561,050 | 5/1971 | Danforth | 264/117 |
| 3,634,115 | 1/1972 | Minnick | 106/85 |
| 3,753,620 | 8/1973 | Minnick | 404/76 |
| 3,781,408 | 3/1972 | Lin | 423/244 |
| 3,785,840 | 1/1974 | Minnick et al. | 106/118 |
| 3,851,042 | 11/1974 | Minnick | 423/244 |
| 3,852,084 | 12/1974 | Webster et al. | 106/118 |
| 3,854,968 | 12/1974 | Minnick et al. | 106/109 |
| 3,859,799 | 1/1975 | Jaco | 210/42 |
| 3,861,930 | 1/1975 | Lin | 106/109 |
| 3,870,535 | 3/1975 | Minnick et al. | 106/118 |
| 3,962,080 | 6/1976 | Dulin et al. | 106/DIG.1 |
| 4,045,463 | 10/1977 | Lin | 106/109 |
| 4,049,462 | 9/1977 | Cocozza | 106/109 |
| 4,101,332 | 7/1978 | Nicholson | 106/DIG. 1 |
| 4,120,238 | 10/1978 | Tate | 106/DIG. 1 |
| 4,153,655 | 5/1979 | Minnick et al. | 264/8 |
| 4,171,951 | 10/1979 | Lin | 432/77 |
| 4,226,630 | 10/1980 | Styron | 106/DIG. 1 |

OTHER PUBLICATIONS

Vuceta et al., Characteristics and Disposal of Solid By-Products from Dry Gas Desulfurization Systems, 73rd Ann. Meeting of Air Pollution Control Assns., Montreal, Quebec, Jun. 22-27, 1980.
Ellison et al., By-Product-Utilization/Ultimate Disposal of Gas Cleaning Waste from Coal-Fired Power Generation, Proceedings/Symposium of FGD, Mar. 1979, pp. 1189-1203.
Phillips, An Evaluation of the Waste Product from a Calcium Based Dry Flue Gas Desulfurization System, M.S. Thesis, U. of Tenn., Knoxville, Jun. 1979.
Blythe et al., Survey of Dry $SO_2$ Control Systems, EPA-600/-2-80-030, Feb. 1980, pp. 15-19.

*Primary Examiner*—James Poer
*Attorney, Agent, or Firm*—Schuyler, Banner, Birch, McKie & Beckett

[57] ABSTRACT

Strong dense shaped articles such as pellets suitable for use as gravel substitutes are produced by the described method from solid fly ash-containing water materials obtained by a lime based dry scrubbing flue gas desulfurization operation. In this method the dry ash-containing waste powder, which also contains calcium sulfite or sulfate reaction products and unreacted lime, is first uniformly contacted with a critical amount of water and then immediately compacted at a critical compaction ratio to provide a handleable green body in which the fly ash particles are positioned with respect to one another so that the interstitial spaces are sufficient to accommodate the volumetric changes in wthe cementitious materials without any deleterious expansion of the article as the article is cured.

26 Claims, 9 Drawing Figures

(1000X)

(300X)

ANTELOPE, 4% H₂O

ANTELOPE, 4% H₂O

TUCSON-UNTREATED
4% H₂O

TUCSON-HEAT TREATED (120° C)
4% H₂O

60 DAY CURE

60 DAY CURE

60 DAY CURE

SHAPED CEMENTITIOUS PRODUCTS

The present invention relates to a process for preparing useful shaped cementitious articles from the waste products of the combustion of coal. More specifically, this invention relates to the preparation of shaped articles such as pellets, bricks, tiles, blocks and the like by a closely controlled compaction process directly from the fly ash-containing powder produced in a lime-based dry scrubbing process for removal of fly ash and $SO_2$ from flue gases.

Among the products of coal combustion, fly ash and the acid gases, primarily sulfur dioxide, in the flue gas are the major causes of air pollution. Flue gas cleaning systems presently employed produce large quantities of solid waste which include recovered fly ash and sulfur-containing reaction products from scrubbing operations. The worldwide shortage of oil and gas for heating and power generation is causing a shift to coal burning, with a resultant increase in the production of these solid wastes. It has been established that some 73 million metric tons of fly ash and some 22 million metric tons of flue gas desulfurization sludge will be produced in the U.S. by the year 1986. Disposing of this mass of material is costly, requires land, and causes secondary environmental problems that must be dealt with to avoid pollution of groundwaters and loss of land values.

Solid wastes from coal combustion systems include two basic types, namely, those removed by dry collection upstream or downstream of the $SO_2$ scrubber, or collected in the scrubber itself, and scrubber waste, usually as sludge. Wet scrubbers can be categorized as either throw-away or recovery. The most common process, the single closed-loop throw-away, disposes of its waste after reclaiming a certain portion of the water which is recycled to the scrubber to maintain water balance. The double-loop throw-away process, called dual-alkali, uses one loop to recirculate scrubber reagent and another loop to regenerate this reagent and remove waste sludge.

The one thing all wet scrubbing flue gas cleaning systems have in common is the generation of a calcium sulfite/calcium sulfate sludge, with a low solids content and a limited structural load-bearing capability. This sludge is fine-grained and highly water retentive. After settling, it will solidify somewhat, but it reverts to a fluid consistency when disturbed. Sludge solids contain leachable and potentially toxic salts and the dissolved salts in the waste water occluded in the sludge contain trace quantities of soluble heavy metal elements from the coal used as fuel.

The prior art describes attempts to produce relatively low density shaped products from wet flue gas scrubber waste, see, e.g., Minnick U.S. Pat. No. 3,785,840. These prior art processes, however, have been generally unsuccessful.

The advent of the dry scrubbing system for $SO_2$ and fly ash removal from flue gases represents a major advance in the art of pollution control. It has been estimated that dry scrubbing systems will occupy a major role in $SO_2$ and fly ash removal from the some 200,000 megawatts of coal burning capacity which is expected to be added to the U.S. electric utility systems by 1990. Dry scrubbing systems are unique in that a dry waste is produced which can comprise fly ash in intimate association with the materials produced by the reaction of $SO_2$ with calcium oxide and other metal oxides present in the system. A powder is produced in the dry scrubbing system, as contrasted to a high water content, low solids content waste product produced in wet scrubbing systems. The dry scrubbing waste powder is still produced in large quantities and therefore it would be extremely desirable to provide a process for economically converting this waste into useful materials.

Accordingly, it is an object of this invention to economically utilize the solid fly ash-containing waste materials from the dry $SO_2$ scrubbing of flue gases from coal combustion.

More specifically, it is an object of the present invention to provide from these waste materials dense shaped structural articles bonded by cementitious reaction products and a process for producing these articles.

These and other objects of the present invention can be achieved by providing a process for preparing a dense shaped article, which article comprises fly ash particles bonded together by cementitious reaction products, the process comprising the steps of providing a substantially dry fly ash-containing powder obtained from the dry scrubbing of fly ash-containing flue gas with lime, the fly ash-containing powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof; uniformly contacting the fly ash-containing powder with a predetermined amount of water; forming the powder/water mixture into a shaped article by confined compaction at a predetermined compactive effort sufficient to provide a handleable green body; the predetermined amount of water being selected as at least that amount sufficient to satisfy the short term hydration demands of the powder and further selected in combination with a selected predetermined compactive effort to produce a green body having an uncured dry density in the range of from about 95 to about 140 pounds per cubic foot and wherein the interspatial voids between the fly ash particles in the green body are sufficient to accommodate the subsequently formed cementitious reaction products without deleterious expansion of the article; and curing the green body product in a moist atmosphere to form a shaped article bonded by the cementitious reaction products.

The present invention also provides a dense hardened cementitiously bonded shaped article made from a composite material which comprises a fly ash-containing powder, the powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof, the composite material exhibiting a splitting tensile strength of at least about 300 psi and a cured dry density of from about 95 to about 140 pounds per cubic foot.

The product of cementitious processes involving interaction of metal oxides in aqueous systems is highly time and spatially sensitive relative to any solid phase such as fly ash contained in the article produced. As cementitious reactions proceed, the reaction products formed undergo volumetric changes which must be accommodated in the final object produced when curing is completed. It is essential to achieving a product having the desired characteristics to strictly observe the critical relationships between the amount of water added to the powder and the compaction operation which determine the spatial arrangement of fly ash particles in the green body. Added water in addition to providing an essential reactant in early hydration reactions, serves as a space control agent which in part determines the void space in the compacted article. The density of the compacted article must be controlled (by amount of added water and compaction ratio) to give an article with sufficient void space to accommodate the reaction products formed. If too much or too little water is employed or if too much or too little compaction is effected, the product will not exhibit the unexpected superior properties achieved by the present invention. Critical control, insofar as time of water addition in relation to the compacting operation is also required to utilize latent bonding properties of cementitious reactions available. In the process of this invention, the cementitious activity of the waste powder may be increased by converting sulfites to sulfates and calcium sulfate dihydrate to hemihydrate. In toto, these factors are controlled to produce hard dense shaped articles in which the fly ash is bound in solid fixed relationship, one particle to another, by the cementitious agents comprising the final reaction products of calcium oxide and other oxides, sulfates, silicates, aluminates and other constituents of the system.

In the drawings which illustrate the preferred embodiments of the present invention:

As used throughout the instant specification and claims, the term fly ash is intended to refer primarily to flue gas-entrained ash from the combustion of coal. The term line is intended to refer both to calcium oxide (CaO) and its hydrated form, calcium hydroxide (Ca(OH)$_2$).

One of the primary components of the product of the present invention is fly ash. Fly ash from coal combustion occurs as spherical particles, usually ranging in diameter up to 100 microns. The chemical makeup of fly ash can vary widely depending on the geologic and geographic factors affecting the coal deposit and on the combustion conditions. Coal can be classified under the ASTM ranking system as anthracite, bituminous, subbituminous and lignite. Fly ashes from each of these ranks usually contain as major constituents $SiO_2$, $Al_2O_3$ and $Fe_2O_3$. Some ashes, particularly those from subbituminous or lignite coals can contain significant quantities of CaO. Various fly ash materials may also contain minor constituents such as magnesium, titanium, sodium, potassium, sulfur and phosphorous and may further contain trace concentrations of from 20 to 50 additional elements.

The process of the present invention can utilize fly ash from the combustion of any of the coal types. It is preferred to employ fly ash which contains at least about 10% CaO. Typically, subbituminous and lignite coal ashes meet this requirement and therefore these fly ashes are the most preferred. In order to improve the reactivity with water, it may be necessary to add lime or other cementitious adjuvants to fly ashes derived from bituminous coals. In most cases, however, the reactivity of the fly ash-containing dry scrubber product can be enhanced to a suitable level during the dry scrubbing operation.

Figure 1:
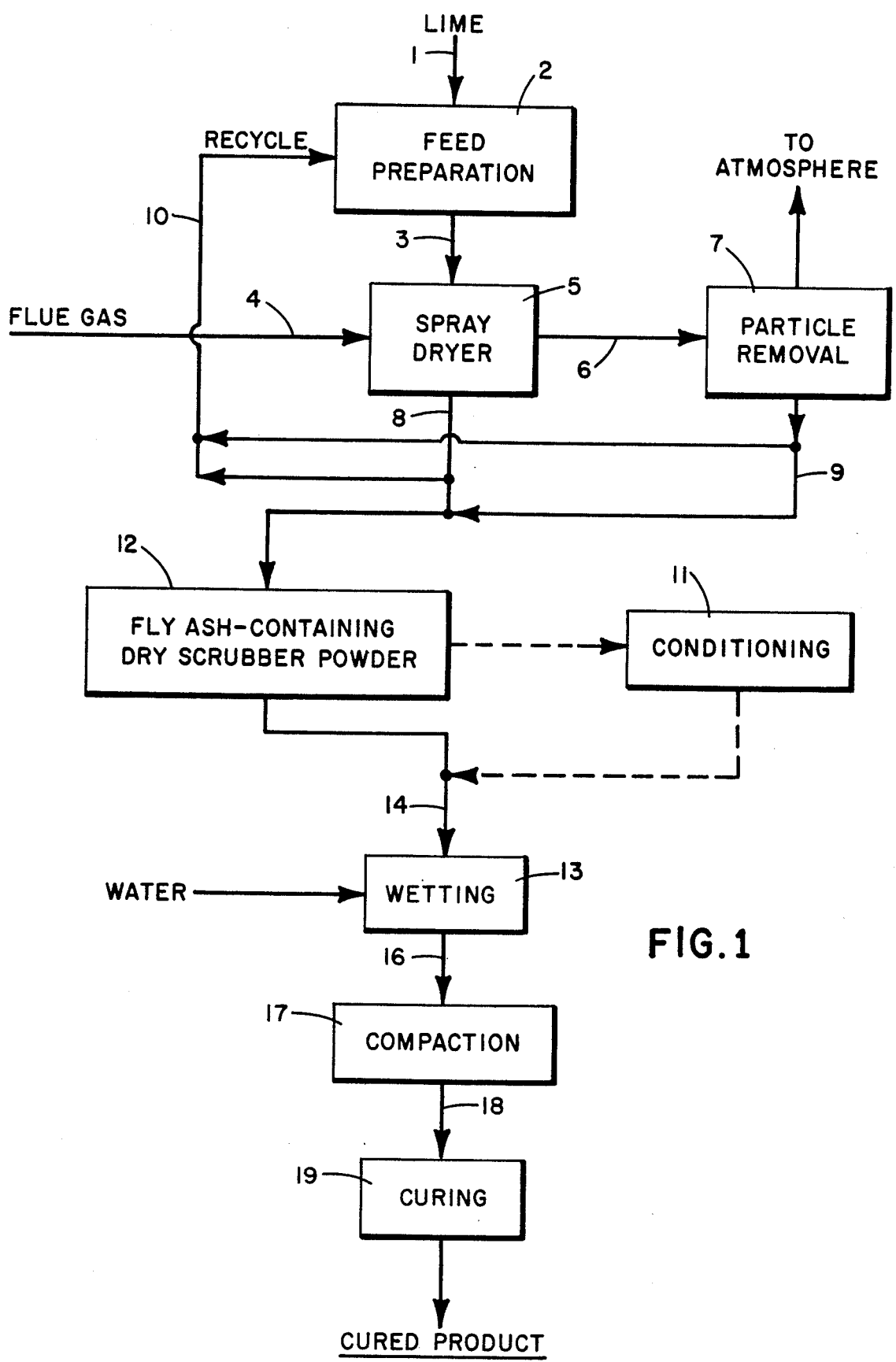
FIG. 1 is a flow diagram of one form of the process of the present invention.

One preferred form of the process of the present invention including preferred steps for producing the fly ash-containing dry scrubber powder is shown in FIG. 1. In the illustrated embodiment, calcium hydroxide 1 is mixed with water in a slurry tank 2 to provide an aqueous feed suspension 3. This feed suspension is then atomized in a stream of hot, fly ash-containing flue gas 4 in a drying chamber 5 to effect substantial drying of the resulting atomized droplets and partial absorption of the sulfur dioxide in the flue gas. A portion of the resulting dry powder comprising fly ash, reaction products and unreacted materials 6 is passed along with the flue gas to a particulate removal device 7 in which further reaction may take place. A first portion 8 of the free flowing dry powder produced in the drying chamber is collected directly from the bottom of this chamber, and a second portion 9 of the powder is collected from the bottom of the particulate removal device. Finally, a portion of said fly ash-containing powder 10 is recycled for preparation of the aqueous feed suspension. The drying and sulfur dioxide absorption are effected while maintaining the temperature of the flue gas leaving the drying chamber at from about 8° to 40° C. above the adiabatic saturation temperature of the gas by controlling the amount of feed suspension forwarded to the drying chamber and the total solids content of the feed suspension in response to the amount, temperature, and moisture content of the flue gas feed to the drying chamber. More details of this preferred dry scrubbing process can be obtained from commonly assigned U.S. Application Ser. No. 039,892, filed May 17, 1979, U.S. Pat. No. 4,279,873 which is hereby incorporated by reference. Other dry scrubbing processes may be used as long as they produce a fly ash-containing waste powder as hereinafter described.

Figure 2B:
FIG. 2 is a series of photomicrographs showing the physical characteristics of a dry scrubber waste powder useful in the process of the present invention.
Figure 2A:
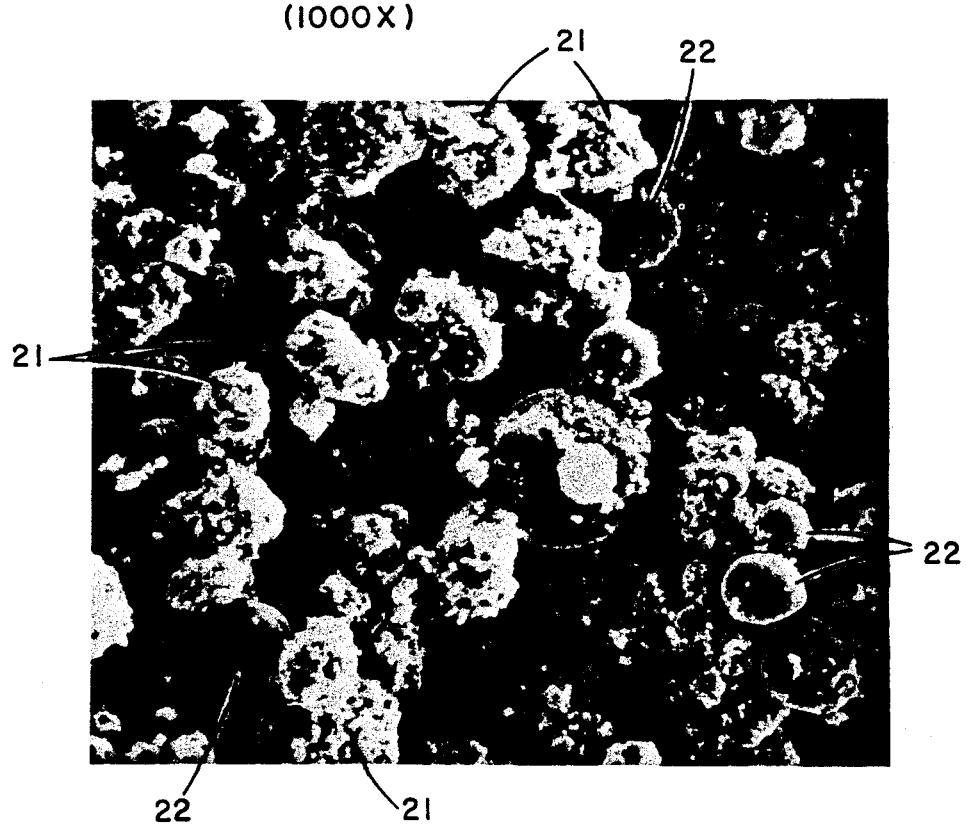

In general, the dry waste powder obtained from the above-described dry scrubbing process is predominately fly ash particles coated with the reaction products and unreacted reagent. A small percentage of the powder (up to about 10-15%) may comprise fly ash particles which appear substantially unchanged by the scrubbing reaction; a small percentage of reaction materials unassociated with fly ash may also be present. The fly ash particles include those captured directly from incoming flue gas and those recycled through the reagent preparation procedure at least once. Reference to the series of photomicrographs in FIG. 2 (FIG. 2 is at 300X; FIG. 2B is at 1000X) shows the coated fly ash particles 21 and the apparently unchanged fly ash particles 22. FIG. 2 clearly shows the microparticulate nature of the reaction material crystallites on the surface of each individual fly ash particle. Since these crystallites are formed in a very short time in the spray drying-/absorption step, there is very little time for well ordered large crystal growth. The very high reactivity of the powders used according to the process of the present invention is believed to be due, at least in part, to this unique physical structure.

The gross composition of this dry scrubber powder will vary with the nature of the coal burned and its resultant ash, with the amount of scrubbing reagent, and with the conditions of the scrubbing operation. Broadly speaking, the powder comprises fly ash, scrubbing reaction products, primarily calcium sulfite and calcium sulfate, and unreacted reagent lime as either CaO or Ca(OH)$_2$. Some CaO may react to form calcium-aluminosilicate hydrates or similar compounds on the surface of fly ash particles during scrubbing or reagent preparation.

In general, the dry scrubber waste powder useful according to the present invention comprises by weight from about 10 to 85% fly ash; from about 10 to 60% CaSO$_x$ (various forms, including calcium sulfite hemihydrate, and the dihydrate, hemihydrate and anhydrite of calcium sulfate-depending primarily on the temperatures in the absorber and collection system); from about 1–30% unreacted lime (primarily as Ca(OH)$_2$); and up to about 7% free water. A preferred analysis of such a powder based on a low-sulfur western coal ash is as follows:

| Fly ash | 70–80% |
| --- | --- |
| CaSO$_x$ | 12–24% |
| Lime | 3–10% |
| Free water | 3–5% |

The amount of water which is chemically bound as hydrates in this powder prior to product formation can be estimated from the chemical compounds present. Assuming that 90% of the lime is hydrated, that CaSO$_x$ is 65:35 sulfite to sulfate and that the sulfate is 50:50 dihydrate to hemihydrate, the chemically bound water can vary from about 1.5 to about 13% by weight of the product. The preferred analysis for low sulfur western coal ash products is about 2 to 5% bound water.

The first collected portion of powder 8 from the bottom of the drying chamber may differ somewhat in composition from the second portion of powder 9 collected in the particulate removal device. In a typical operation, material collected from the bottom of the drying chamber contains about 70% by weight fly ash, 13% by weight calcium sulfite, 7% by weight calcium sulfate, 5% by weight unreacted lime, and 5% by weight free water. Material collected from the particulate collection device, (e.g., a bag house) contains about 72% by weight fly ash, 15% by weight calcium sulfite, 9% by weight calcium sulfate, 1% lime and 3% free water.

The powder from a dry scrubbing operation can be stored for short periods, e.g., on the order of weeks or months, and still be useful in the process of the present invention. It is preferred, however, to utilize this powder immediately after it is formed in the scrubbing operation to take full advantage of the nascent cementitious properties of this material.

Both the first and second collected portions of powder from the flue gas cleaning operation, as detailed in the foregoing, contain latent cementitious materials as they normally exit the process. It may be desirable, in some cases, to further develop the latent bonding potentials before using the dry scrubber powder according to the present invention. It is possible by adjusting the scrubber parameters to achieve this objective. Referring again to FIG. 1, a separate conditioning step 11 optionally can be used to enhance the cementitious properties of the fly ash-containing dry scrubber waste powder 12. In such a separate conditioning step the primary objectives are to convert sulfites to sulfates and to at least partially dehydrate sulfates or sulfites. The preferred process for accomplishing these objectives is subjecting the powder from the scrubber to a mild heating process. This heating process can be suitably carried out, e.g., in a fluidized bed, at a temperature from about 120° C. to about 350° C. While either oxidizing or reducing conditions can be employed during this heating, a mild oxidizing atmosphere is preferred. The heating can be carried out in a continuous manner for a period sufficient to complete the dehydration reaction as is known. Typically, heating at about 140° C. for about 10 minutes is effective to achieve the objectives of this treatment. The exact parameters necessary to effect this conditioning step will, of course, vary with specific powder produced in the scrubber.

In the next step of the process of the instant invention, shown generally at 13, the optionally conditioned waste material 14 is intimately and rapidly contacted with a predetermined amount of water 15. The amount of added water, and the mode of adding water are critical in accomplishing the process of the present invention. The addition of water serves several very important functions in the present invention. First of all, the added water serves as a reactant in the rapidly proceeding hydration reactions with the various cementitious materials present. These rapid rate hydration reactions which can be termed "short term" reactions to distinguish them from the slower rate hydration reactions which continue during curing in a moist atmosphere, are, in combination with the densities achieved, responsible for the high initial strength of products formed according to the present invention. Secondly, the added water serves an important function as a space control agent. As indicated above, as the cementitious reactions proceed the reaction products formed tend to swell. In order to avoid disruption of the hardened matrix, and attendant decrease in strength properties it is essential to provide sufficient void space in the formed green body to accommodate the volumetric chages which result upon extended curing. To this end, added water preserves void spaces during the compaction step. Added water also serves as a lubricant and a temperature/rate of reaction moderator during the compaction step.

Water addition is preferably carried out immediately before the compaction step described below. Added water begins to react with the powder of the present invention immediately and if the fly ash particles have been compacted into the requisite spatial relationships as described below while these cementitious reactions are taking place, then optimum bonding of the particles occurs. It is possible to delay the compaction step for a short period of time after the addition of water without any significant adverse affect on the strength properties of the cured product. Delay times of up to about one hour or more can be utilized depending on the reactivity of the fly ash-containing powder and the amount of added water. Short delay times may actually enhance the short term properties of the formed product, probably due to more uniform distribution of the water by capillary action during the aging step.

Water should be added to the powder in a manner that ensures rapid and uniform distribution. Large slugs of water preferably should be avoided. In addition to aging described above, the requisite uniform water distribution can be effected by mixing. For batch type operations this mixing can take place in any suitable equipment such as a paddle mixer or the like. Another suitable manner of effecting the addition and distribution step is by the use of a finely divided spray directed into a mass of powder that is being efficiently mixed and tumbled. Apparatus such as commercially available pug mills can be employed for this purpose. Water addition and mixing are preferably carried out at ambient temperatures although somewhat higher or lower temperatures can be employed. Mixing time can vary with the equipment used but typically this step can be accomplished in a very short period, i.e., on the order of a few seconds up to several minutes. Preferably, mixing times of up to about 5 minutes are employed. The use of longer mixing times, i.e., up to about 15 minutes, can result in compacted products exhibiting higher early strengths than similar products mixed for shorter periods.

Addition and distribution of water can also be effectively accomplished by passing steam through the powder under conditions favoring condensation of water throughout the mixture.

The amount of added water used is critical to achieving a strong dense cured product. Powders from different sources have somewhat different water requirements due to the variabilities of the reactivity and physical characteristics of the powder (which vary with the nature of the fy ash and scrubber operating conditions).

The primary criteria for selecting the proper amount of added water are (1) the short term hydration demands of the powder and (2) the requisite interspatial relationship between the fly ash particles. The second factor is critically interrelated to the type and extent of the compaction operation. In practice the amount of added water should be at least that amount necessary to satisfy the short term hydration demands of the particular powder and further defined as the amount which provides, for a given compaction operation, a shaped green body having adequate interspatial voids to accommodate substantially all the subsequently formed cementitious reaction products. If, for a given compaction operation, too little water is employed, the green body may be overdensified in the compaction step. Overdensification can result in a product which "comes apart" as it cures to expansion of interspatial reaction products to a volume larger than the interspatial voids. The strength of the cured product is also adversely affected by adding too much water—which may lead to underdensification. The amount of interspatial void area necessary to accommodate the subsequently formed reaction products will depend in part on the reactivity of the powder and the conditions of curing. In general, an initial dry void space of from about 5 to about 40% by volume can be satisfactorily employed. Preferably, the void space can range from about 10 to about 35%. Percent volumetric void space can be calculated by the following formula:

$$\left[1 - \frac{\text{dry article density}}{\text{absolute density}}\right] \times 100$$

An alternative measure of the initial shaped product void space is the dry density of this product. Typically products according to the present invention should have a dry density in the range of from about 95 to about 140 pounds per cubic foot and preferably from about 100 to about 130 pounds per cubic foot.

As a practical lower limit, the amount of added water must be sufficient to form a mixture which can be compacted into a coherent handleable mass on a given type of compaction equipment. This practical lower limit varies widely with the reactivity and physical characteristics of the powder and nature of the compaction equipment. As a practical upper limit the added water also should not exceed that amount which can be compacted on the particular compaction equipment chosen. For example, a very high water content mixture (mudlike) cannot normally be compacted into a coherent handleable shape with the preferred range of product densities. The effect of particular compaction equipment on water requirements is further demonstrated by the case of a high speed, extrusion-type pelletizing apparatus described hereinafter. Because of the high temperatures generated by frictional forces, some of the free water in the powder mixture is lost by evaporation. Accordingly, the optimum water additive levels are generally higher for this type of process than for low water loss compaction systems. Similarly, water requirements may also be affected by the die size in an extrusion process. Generally, larger die sizes can be operated with less added water.

In general, for the powders and compaction equipment described in the examples, water addition amounts of from about 4% to about 20% by weight based on the powder have been successfully employed. Optimum properties for these powders compacted on commercial scale pelletizing apparatus generally are achieved with added water in the range of about 10% to about 20%. As described below, lubricants and other additives may be employed to reduce the water requirements somewhat.

The next step in the process, the water/powder mixture 16 is compacted at 17 to form a shaped handleable green body 18. The compaction preferably is performed immediately after the water addition step. Keeping the time between water addition and compaction relatively short is instrumental in obtaining the most effective bonding of the fly ash particles using the cementitious products formed by the reaction of the calcium oxide with silica and other materials present, and the relatively rapid calcium sulfate hemihydrate to dihydrate transformation.

It is essential that the compaction operation be controlled by selecting a compactive effort (i.e., compressive force) which, in conjunction with the amount of added water, will provide a handleable green body having the necessary void space between the fly ash particles to accommodate the subsequently formed cementitious reaction products. Under proper compaction conditions the fly ash spheres are positioned, relative to an adjacent sphere, such that firm bonds are formed by the cementitious agents formed during curing. If the spheres are too close together after compaction, the formed article will swell and disrupt the cementitious matrix upon curing. If the spheres are too far apart, insufficient weak bonds will form. As shown in the examples, overdensification leads to strength and density regression upon extended curing. The exact amount of compressive force needed to achieve these objectives will, of course, vary with the powders and type of product being formed. In general, however, the proper degree of compaction, for a given amount of added water, can be determined with reference to the article density or percent void space. As indicated above, the compacted shaped green product should have a dry density in the range of from about 95 to about 140 pounds per cubic foot or when expressed as percent void space, from about 5 to about 40% by volume. The optimum compactive effort for any given powder/water mixture can best be determined experimentally in accordance with the teachings of this invention. Compaction ratios can be calculated by taking the ratio of the dry shaped article density to the dry loose bulk density of the powder. In general, compaction ratios in the range of from about 2 to about 3, depending on the particular powder employed are suitable for the practice of the present invention. For the powders described in the examples, compaction ratios of from about 2.4 to about 2.8 achieve the desired optimum spatial relationship.

The nature of the compaction operation will, of course, vary with the type of product being formed. While any of the well known compacting and shaping systems may be employed, it is preferred to use a compaction system which forms the product very rapidly under high energy conditions. In the case of the preferred product according to this invention—gravel pellets—this rapid high energy compaction system can be a high speed extrusion type pelletizing mill exemplifie by the roller ring mill sold by the California Pellet Mill Company. In this type of equipment the product is formed very rapidly and in the presence of lubricating steam generated by the frictional heating of process water. Typically, bulk material temperatures of up to about 140° to 160° F. or more may develop in this type of process. Under these conditions the formed product exhibits very high initial strength properties due in part to temperature induced acceleration of the rate of early short term hydration and other curing reactions.

The compaction step should be carried out as rapidly as practical on the equipment chosen. For a typical commercial size pellet forming operation this compaction step can be accomplished in less than about one second.

In the final step of the process, the compacted green body 18 is cured at 19. Curing is the process whereby cementitious reaction products are formed which bind the powder mass together into a hardened article. Formed products of this invention acquire ultimate strength only after weeks, months, and years following manufacture, as is the case with conventional pozzolan cements. However, due to the relatively rapid curing rate possible with the unique finely divided reaction components of this invention, the formed products are serviceable after a few days, curing in humid air.

Typically, the products of the present invention may reach minimum acceptable strength in as little as ten days at 100° F. Curing of the products of the present invention can be accelerated by the use of heat and moisture, e.g., minimum acceptable strength may be achieved in as little as two days at 120° to 180° F. In the manufacture of pellets for use as gravel substitutes the initial curing can be effected in storage silos for about one to ten days. By placing the pellets in sealed storage shortly after formation, the trapped moisture-saturated air, the undissipated heat generated in the pelletizing process and the heat of the cementitious reaction can be utilized to facilitate the curing process. The use of periodic water sprays or soaking in a preferred method of ensuring the requisite moisture for long-term hydration demands and optimum curing.

As is generally known in the compaction and shaping art, minor amounts of additives may be employed to facilitate processing and modify product properties. These known additives can be employed in the compositions of the present invention in conventional amounts and for conventional purposes. Examples of such additives which may be utilized include lubricants such as stearic acid, oils, waxes, oily grains (e.g., oats), carboxymethyl cellulose and other cellulosic materials such as starches and sugars; binders such as calcium sulfate hemihydrate, water glass, synthetic resins and latices and Portland cement; solid adjuvants such as lime kiln dust or cement kiln dust; water reducing agents such as calcium lignosulfonate; water proofing agents such as calcium stearate; corrosion control agents such as calcium nitrate; wetting agents, and the like. Additive amounts should be kept at a minimum, i.e., no more than necessary to achieve the intended function. Typically, lubricants are conventionally employed at levels of about 3% or less by weight; binders are conventionally employed in amounts of up to about 10% by weight.

The product of the present invention is a dense shaped article containing fly ash particles cementitiously bonded together. As described above, one preferred form of this product is a shaped pellet or granule which can be used as gravel substitute. This pellet finds utility in all normal uses of gravel such as in road bed compositions, as structural fill, as an aggregate in concrete and concrete structural products, and the like. Other shaped articles which may be produced according to the present invention include bricks, tiles, blocks and other structural shapes. For purposes of the following discussion the product of this invention will be described primarily as a gravel substitute pellet.

The gravel substitute pellet made according to the present invention has strength and density properties which compare favorably with natural gravel products. In material respects the products of this invention meet or exceed the specifications for limestone or dolomitic gravel. Depending on the nature of the waste powder starting materials and the length and conditions of cure, the material of the articles of the present invention can achieve splitting tensile strengths of at least about 200 psi. The preferred high strength materials of the present invention have splitting tensile strengths of at least about 300 psi and preferably at least about 400 psi. Typically, the high strength materials of this invention may achieve splitting tensile strengths of from about 500 to 1000 psi or more. In general, to maximize economic considerations the process parameters can be varied to produce a product with strength values that are no higher than required for a specific application. The attrition resistance of the product of the present invention is also very high as demonstrated in the examples. The products of the invention also have good hardness properties—ranging from about 3 to 4 on the Mohs hardness scale. Dry densities of these products can range from about 95 to 140 pounds per cubic foot or more and for the preferred high strength materials at least 100 pounds per cubic foot.

The following examples are intended to illustrate more fully the nature of the present invention without acting as a limitation on its scope.

EXAMPLE 1

This Example demonstrates the criticality of proper compaction in the process of the present invention. A fifty gram sample of material representing the waste product from a dry scrubber flue gas desulfurization operation (identified as Antelope Samples #2230) was placed in a high shear Waring Blender wherein, under rapid mixing conditions, two grams of water was added via a volumetric pipette. Mixing was continued for thirty seconds and a portion of the material immediately formed into pellets approximately 7.4 millimeters in diameter by 7.7 millimeters length, using a volumetric compaction ratio of approximately three volumes of loose powder to form each pellet. Three groups of pellets were made over a time span of ten minutes, using punch pressures of 20, 12, and 5 tons per square inch. Respectively, the test pellets average 7.7, 7.9, and 9.5 millimeters in length, thus obtaining approximately 23% change in overall pellet volume at constant mass, which translates directly into available space between individual fly ash particles to accommodate cementitious products formed by reactions described supra. The test pellets were cured in a water saturated atmosphere over a period of several months. Curing progress was observed by destructive testing of portions of each batch of pellets at 10 days, 30 days, and 60 days. Measurements were made of attrition resistance and density as they reflect important required use properties. Attrition resistance was determined using a Spex Model 8000 grinding apparatus with a large (2¼ diameter×3" high) grinding chamber. An individual pellet of the samples to be tested is dried to constant weight, weighed and placed into the grinding chamber with no grinding ball charge. The machine is then activated for 15 seconds after which the contents of the chamber are removed and brushed onto a U.S. Standard No. 60 sieve screen. The minus 60 material is brushed through the screen and the remaining plus 60 material is weighed. The percent of original pellet passing through the No. 60 sieve is then calculated. If the plus 60 material is more than 60% of the original pellet, this fraction is returned to the chamber and the above procedures are repeated using cumulative grinding times of 30 sec., 1 min. 2 min., 5 min., 10 min., until 75% or more of the original pellet has passed through the No. 60 sieve. The average time required for 60% of the pellet to pass the No. 60 sieve is determined by calculation and the values reported are the average of three such tests. Density was calculated as follows. The volume in mls. of saturated pellets was measured by displacement in water. The S.S.D. weight (saturated surface-dry weight) of the pellets in grams was obtained. Based on these figures an S.S.D. density was calculated. This value was converted to dry densities by using a percent absorption factor which is the difference in S.S.D. weight and 130° F. dry weight divided by the dry weight.

Figure 3:
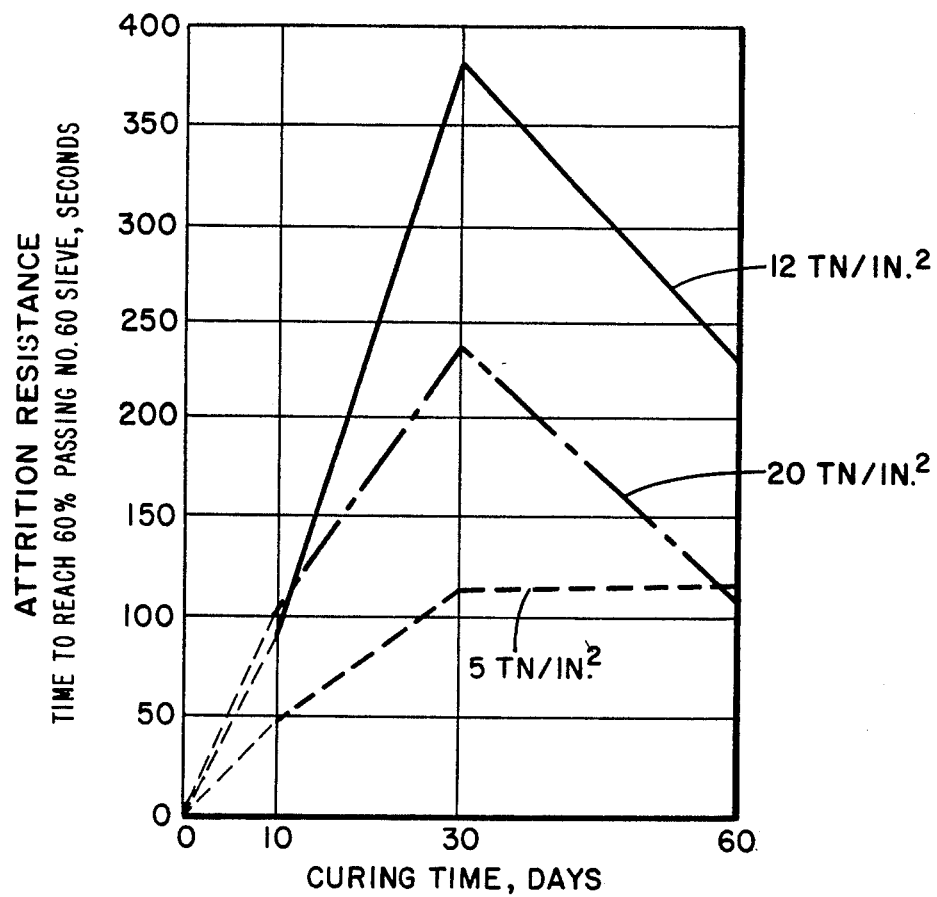
FIGS. 3-9 are graphs which illustrate the unique properties of the products produced according to the present invention.

FIG. 3 shows the effect of compaction on attrition resistance as curing progresses. Relatively poorly compacted pellets, pressed at 5 tons per square inch, were initially friable and after some brief early gain did not appreciably gain in attrition resistance as curing progressed beyond 30 days. Pellets highly compacted at 20 tons per square inch showed the highest initial resistance to attrition, but lost in attrition resistance as curing progressed beyond 30 days and internal pressure developed as a result of insufficient space available to accommodate forming cementitious materials. Pellets pressed at 12 tons per square inch had intermediate initial attrition resistance, but gained much more rapidly in this property, as curing progressed to 30 days and thereafter fell off to a higher value than the powder compacted at 20 tons per square inch.

Figure 4:
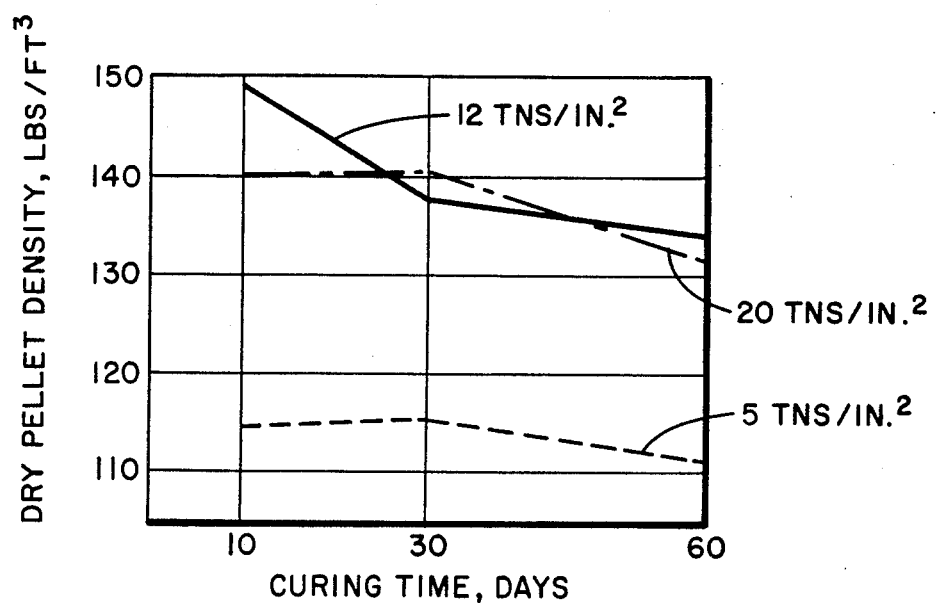

FIG. 4 shows the effect of compaction on pellet density as a function of curing progress. Note that pellets pressed at 5 tons per square inch have relatively low initial density, and density changes only slightly during curing. In highly and intermediately compacted pellets the density decreases as curing progresses, due to particle swelling. Pellets formed at 12 tons per square inch fall off at a slower rate as curing progresses beyond 30 days due to the cohesive and adhesive forces of reaction between the formed cementitious materials and the fly ash particles.

The Antelope sample utilized in this example graphically demonstrates the regression of strength and density values that takes place when the formed product is overdensified (i.e., at 20 ton/in$^2$). This observable effect is believed to be due to the disruptive forces which develop as the reaction products in the interspatial voids swell with curing. The absolute value of compactive force necessary to reach the point at which values begin to diminish varies with each specific powder. Other powders tested to date were not compacted with the purpose of approaching or passing this point of diminishing results.

EXAMPLE 2

Figure 5:
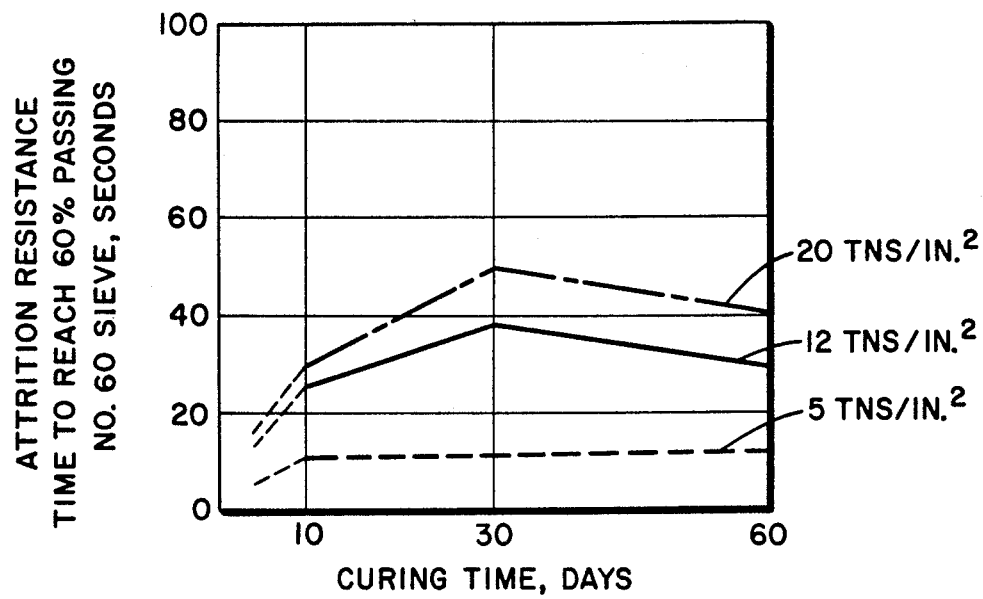
Figure 6:
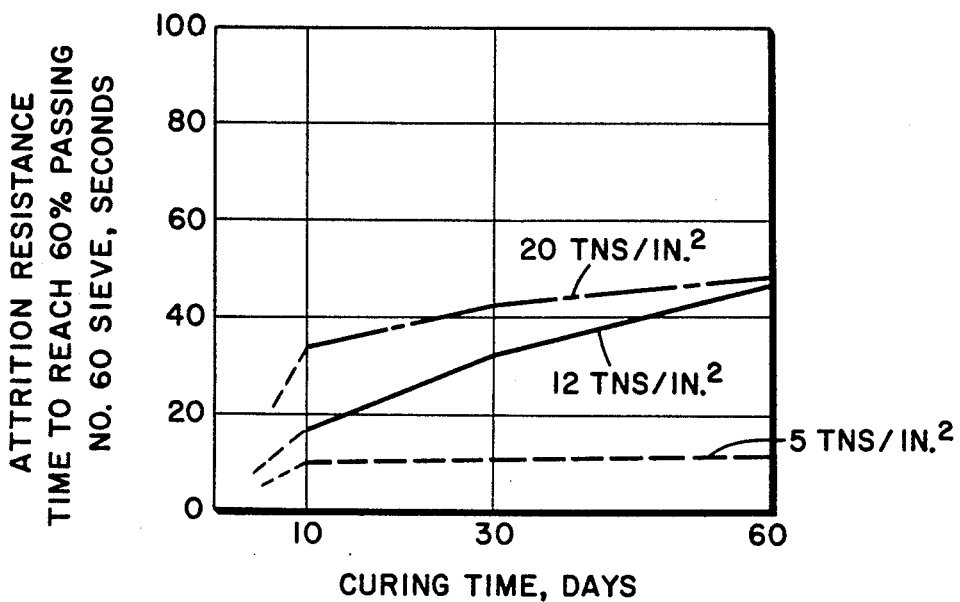

This Example demonstrates the positive effects on strength of using mild heat conditioning to improve the reactivity of certain low-activity fly ashcontaining powders. The procedures of Example 1 were repeated using 50 grams of a dry scrubber powder identified as Tucson Sample #2157. One portion of this sample was employed as received and a second portion was used after a mild heat treatment (at 120°C.), to convert the dihydrate forms of calcium sulfate to the hemihydrate form. FIG. 5 is a plot of attrition values, as measured in Example 1, against curing time for given compaction levels using the as received powder. The same data for the heat treated powder is presented in FIG. 6. A comparison of these two figures demonstrates an improvement in long-term attrition properties for the heat treated sample.

EXAMPLE 3

This Example demonstrates the critical effect of added water amounts on the product properties. Weighed portions of three separate powder samples of material representing the total waste product from separate planned dry scrubber flue gas desulfurization operations (identified as Antelope, Tucson and Sunflower) were placed in a Hobart Model N50 paddle type mixer, wherein, measured percentages of water were added. Mixing was continued for about six minutes and a portion of the material immediately formed into pellets using a roll mill pelletizing machine identified as a California Pellet Mill CPM Model CL equipped with 3/16" diameter, ¾" long or ¼" diameter, 1½" long dies. The pellet lengths varied from about 0.15 to about 0.55 inches. The volumetric compression ratio for the different powder samples and water contents ranged from about 1.8 to 2.9. The test pellets were cured in a water saturated atmosphere over a period of several months. Curing progress was observed by destructive testing of portions of each batch of pellets. Measurements were made on splitting tensile strength, attrition resistance and density. Splitting tensile strength of cylindrical pellets is determined using a Rinck-McIlwaine spring tester with modified adaptors to provide uniform loading parallel to the axis of the cylinder, similar to ASTM Method C496. Pressure is applied to each side of the cylindrical pellet through the adaptor at a rate which will cause specimen failure in about 5 to 15 seconds. The splitting tensile strength of the pellets is given by the following:

$$T = 2P/\pi l d$$

where:

T = Splitting tensile strength, in pounds per square inch
P = Maximum load applied indicated by the testing machine, in pounds—force
l = Specimen length, in inches
d = Specimen diameter, in inches Attrition resistance and density were determined as described in Example 1.

Figure 7:
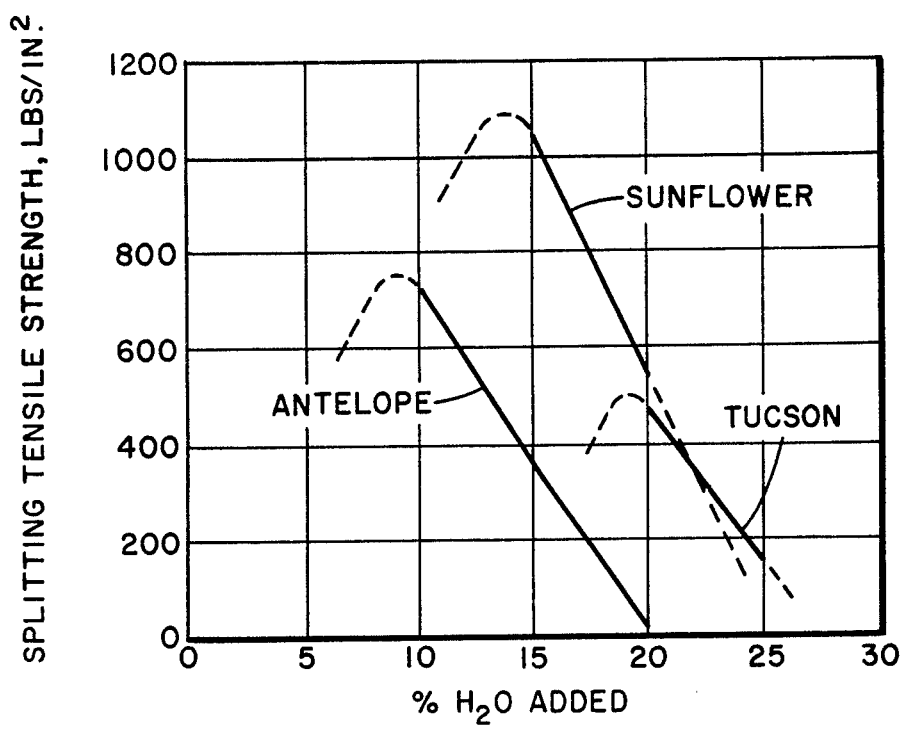
Figure 8:
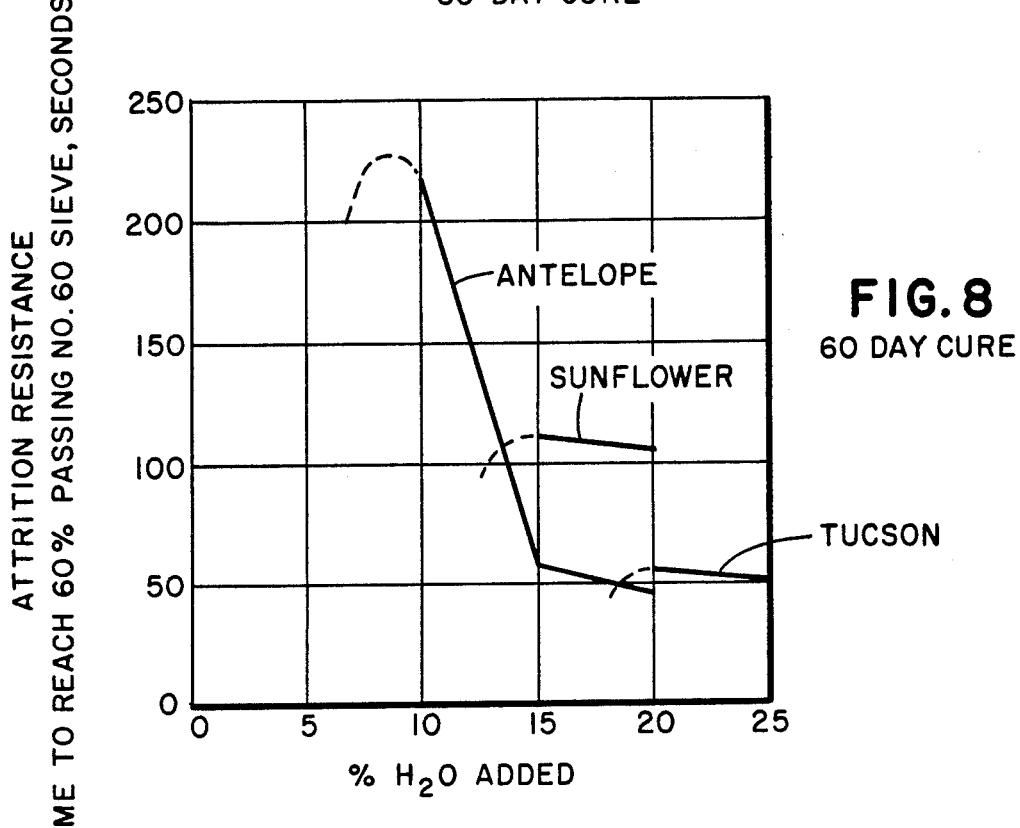
Figure 9:
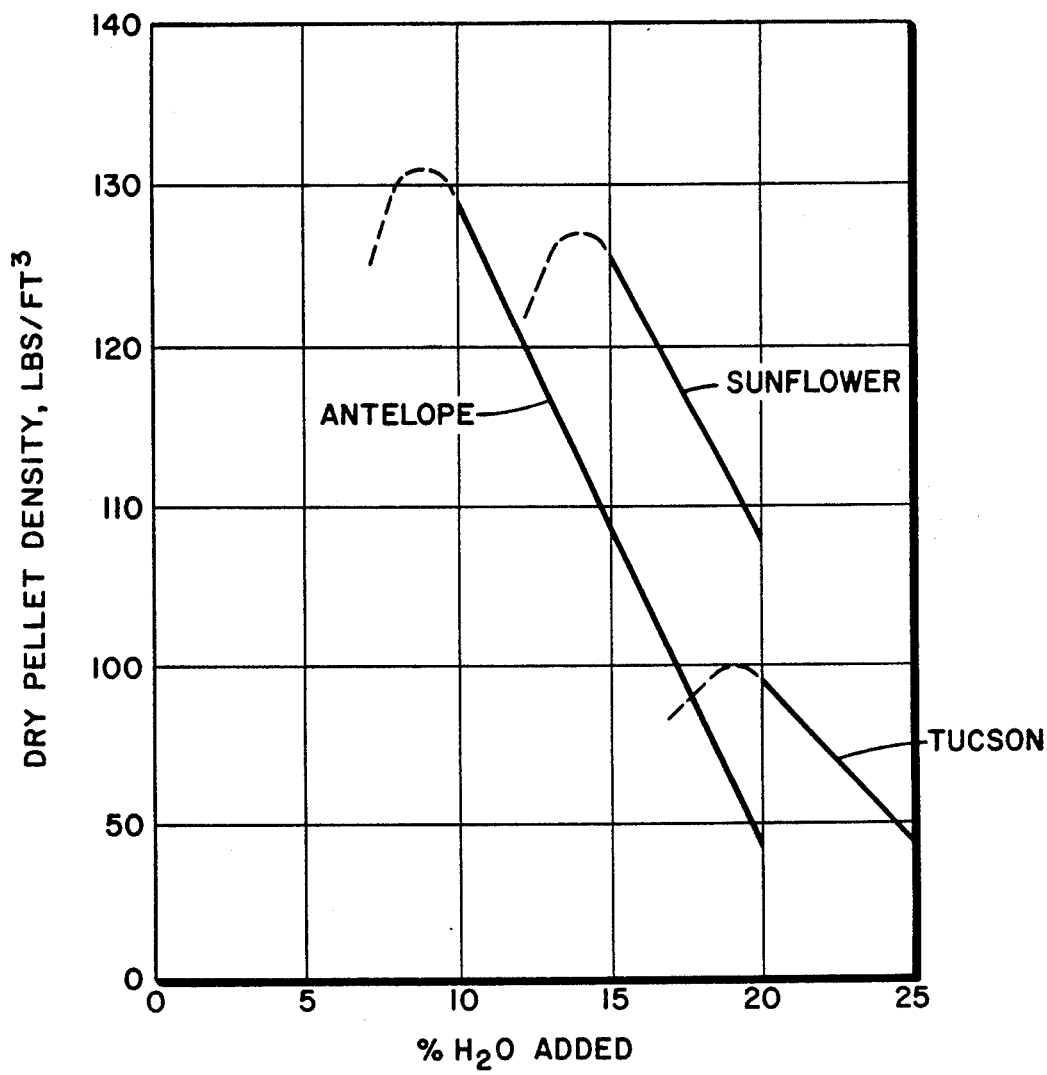

FIGS. 7–9 demonstrate the critical effect of added water on the physical properties of the products of this invention at 60 days of cure. The left side of each curve has been extrapolated back towards 0% water. Because of equipment related limitations coherent pellets cannot be formed below a certain minimum water content which will vary depending on the powder used. As the extrapolated curve approaches this minimum water value, the strength and attrition resistance values will fall off to essentially zero while the density values will fall back towards the loose bulk density of the powder. In each of these figures it can be seen that increasing the added water level beyond an identifiable optimum value results in a decrease of the product properties.

EXAMPLE 4

A second sample of material representing the total waste product from a planned dry scrubber flue gas desulfurization operation (identified as Sunflower) was pelleted in a manner similar to Example 3, but under conditions designed to simulate a production run of gravel. Individual 5000 gm batches of the sample were placed in a Hobart paddle-type mixer, and 15% water (by dry weight of powder) was added by pouring it over a 5 second interval into the mixing bowl while the paddle was operating. Mixing continued at slow speed (140±5 rpm) for a total mix time of 2 minutes. Timing of the batch-mixing was adjusted so that freshly mixed material was continuously available to the California Pellet Mill Model CL pelleting machine, requiring on the average, one fresh batch every 7 minutes. The pelleting die used was a rifle-bore ¼" diameter by 1¼" length die, and the mill was operated continuously without any change in the above procedure for 4 hrs., 45 minutes. The mill came up to working temperature within 15 minutes, producing steaming pellets with a bulk material temperature in the 140° to 145° F. range, and the pellet temperature in composite samples of approximately 50–60 pounds each (representing the product from 4 to 5 batches) reached temperatures of 157° to 164° F. within minutes of production. A total of 503 pounds of gravel was produced. Bulk densities of the pellets as produced, measured at 10 minute intervals, varied narrowly from 70 to 74 lb/cu ft., and the product appeared uniform. The pellet lengths varied randomly, mainly from about 0.15 to 0.60 inches, and the compression factor, based on a loose powder bulk density of 43.8 lb/cu ft., was about 2.8. The composite samples were allowed to cure in plastic bags which were left open at the top overnight (except as noted below) and then closed tightly to ensure that the pellets would be cured in a water saturated atmosphere. The pellets were cured in the sealed bags at ambient temperatures (70° to 95° F.) for 4 days, except for Composite #1 and for two individual batches which were set aside for special tests. The 4-day measurements on splitting tensile strength, attrition resistance, density, hardness, moisture content and absorption, using the previously outlined test procedures are shown in Table 1.

TABLE 1

| | Composite No. | | | | | | | |
|---|---|---|---|---|---|---|---|---|
| | 2 | 3 | 4 | 5 | 6 | 7 | 8 | Ave. |
| 4-DAY CURE, AMBIENT TEMPERATURES | | | | | | | | |
| Dry pellet density, lb/cu ft | 125 | 125 | 125 | 125 | 123 | 123 | 122 | 124 |
| Splitting tensile str., lb/sq in | 756 | 762 | 777 | 689 | 760 | 726 | 684 | 736 |
| Attrition resistance, time to reach 60%, sec. | 115 | 171 | 109 | 111 | 129 | 118 | 101 | 122 |
| Mohs hardness | 4 | 4 | 4 | 4 | 4 | 4 | 4 | 4 |
| Moisture, as cured,% | — | 7.0 | 5.9 | 6.5 | 7.8 | 6.5 | 6.4 | 6.7 |
| Absorption, % | 8.9 | 9.9 | 10.0 | 10.4 | 10.7 | 11.0 | 10.5 | 10.2 |

After the 4-day tests, the remaining pellets were saturated by immersion for 4 minutes (to essentially constant weight), and portions of the surface-wet pellets from each composite were tightly containerized and placed in curing chambers at 100° F. and 140° F.

At day 10, the pellets from the 100° F. and 140° F. curing chambers were tested for the same properties as above, and the results are shown in Table 2.

TABLE 2

| | Composite No. | | | | | | | |
|---|---|---|---|---|---|---|---|---|
| | 2 | 3 | 4 | 5 | 6 | 7 | 8 | Ave. |
| 10-DAY CURE, 100° F. | | | | | | | | |
| Dry pellet density, lb/cu ft | 126 | 128 | 127 | 126 | 129 | 126 | 127 | 127 |
| Splitting tensile str., lb/sq in | 1000 | 991 | 1000 | 951 | 946 | 1010 | 1070 | 995 |
| Attrition resistance, time to reach 60%, sec. | 244 | 250 | 236 | 227 | 232 | 245 | 238 | 239 |
| Mohs hardness | 4+ | 4+ | 4+ | 4+ | 4+ | 4+ | 4+ | 4+ |
| Moisture, as cured, % | 9.8 | 7.4 | 9.0 | 9.5 | 9.6 | 9.3 | 8.8 | 9.1 |
| Absorption, % | 10.2 | 7.4 | 9.1 | 9.6 | 9.8 | 9.7 | 9.2 | 9.3 |
| 10-DAY CURE, 140° F. | | | | | | | | |
| Dry pellet density, lb/cu ft | 126 | 128 | 127 | 125 | 127 | 126 | 127 | 127 |
| Splitting tensile | 1130 | 1010 | 1160 | 1220 | 1190 | 1240 | 1230 | 1170 |

TABLE 2-continued

|  | Composite No. | | | | | | | |
|---|---|---|---|---|---|---|---|---|
|  | 2 | 3 | 4 | 5 | 6 | 7 | 8 | Ave. |
| str., lb/sq in | | | | | | | | |
| Mohs hardness | 4+ | 4+ | 4+ | 4+ | 4+ | 4+ | 4+ | 4+ |
| Moisture, as cured, % | 6.6 | 6.2 | 6.9 | 8.2 | 6.6 | 8.1 | 7.8 | 7.2 |
| Absorption, % | 7.9 | 7.5 | 8.0 | 8.2 | 6.9 | 8.2 | 8.0 | 7.8 |

The results of tests on the composite samples show that a gravel with consistent properties were made during the production run; the properties obtained indicate that the gravel is satisfactory for commercial use.

As noted earlier in this Example, two individual batches of pellets, each weighing approximately 15-20 lbs., were set aside for special tests. Batch No. 1, taken immediately prior to Composite No. 1, was sealed in a plastic bag immediately after production to prevent any subsequent water loss and to simulate curing effects that could occur in a closed silo. Batch No. 2, taken immediately after Composite No. 1, was air cooled and dried at ambient temperature for 20 minutes and then placed in a sealed bag. Composite No. 1 was handled in the same manner as the other composites, discussed above, except that the pellets were saturated for additional curing at 2 days rather than 4 days. Bathes No. 1 and No. 2 were also saturated at 2 days. The results of tests, performed at 2 days and 10 days, are shown in Table 3.

TABLE 3

|  | Batch No. 1 Sealed Immed. | Composite No. 1 | Batch No. 2 Cooled, then Sealed |
|---|---|---|---|
| 2-DAY RESULTS | | | |
| Dry pellet density, lb/cu ft | 122 | 125 | 126 |
| Splitting tensile str., lb/sq in | 686 | 541* | 467 |
| Attrition resistance, time to reach 60%, sec. | 167 | 114 | 191 |
| Mohs hardness | 3 | 3 | 4 |
| Moisture, as cured, % | 7.8 | 7.0* | 6.2 |
| Absorption, % | 9.9 | 9.8* | 9.6 |
| 10-DAY RESULTS, 100° F. | | | |
| Dry pellet density, lb/cu ft | 126 | 124 | 127 |
| Splitting tensile str., lb/sq in | 833 | 876 | 946 |
| Attrition resistance, time to reach 60%, sec. | 226 | 220 | 259 |
| Mohs hardness | 4+ | 4+ | 4+ |
| Moisture, as cured, % | 10.3 | 9.1 | 9.2 |
| Absorption, % | 10.5 | 9.6 | 9.2 |
| 10-DAY RESULTS, 140° F. | | | |
| Dry pellet density, lb/cu ft | 127 | 128 | 124 |
| Splitting tensile str., lb/sq in | 1130 | 1120 | 1200 |
| Attrition resistance, time to reach 60%, sec. | 277 | 296 | 268 |
| Mohs hardness | 4+ | 4+ | 4+ |
| Moisture, as cured, % | 8.9 | 7.4 | 7.9 |
| Absorption, % | 9.4 | 7.5 | 8.6 |

*Average of two tests.

These results show that the amount of moisture present during the early curing period can influence the 2-day strength of the pellets, but the difference in strength is equalized with additional moist curing.

Additional curing effects, not readily explained at the present time, have also been noted in the composite samples. The handling, testing, and saturation of Composites No. 1, No. 2, and No. 4 at 2 days or 4 days of age has been described above. In addition to the tests discussed, tensile strength tests were also performed after two additional days of curing of Composites No. 1 and No. 2, and pellets of Composite No. 4 were also tested at 6 days of age, without earlier saturation. In all cases except the nonsaturated Composite No. 4, the test results listed below in Table 4 are on pellets cured at 100° F. after the initial saturation at 2 or 4 days of age. All pellets were tested in a saturated surface dry condition.

TABLE 4

Splitting Tensile Strength, lb/sq in

|  |  | Test Age | | | |
|---|---|---|---|---|---|
| Composite | Saturation Age | 2 days | 4 days | 6 days | 10 days |
| No. 1 | 2 days | 545 | 1226 | — | 876 |
| No. 2 | 4 days | — | 756 | 1214 | 1000 |
| No. 4 | 4 days | — | 777 | — | 1000 |
| No. 4 | None | — | — | 809 | — |

The results indicate that resaturation of the pellets at an early age can provide a boost in tensile strength, but that a portion of the increase is lost with additional curing.

The effect of the amount of delay between mixing and pelleting was also explored during the production run. Two extra batches of production-type material were prepared in the Hobart mixer during the run and were temporarily set to one side for pelleting later in the run. One such batch that had been mixed 45 minutes earlier was pelleted at the end of the run; the second batch was discarded after visual inspection at 70 minutes revealed relatively large, firm lumps that might have blocked up the pellet mill. Results of tests on the 45 minute delay material are shown in Table 5.

TABLE 5

|  | CURING CONDITIONS | | |
|---|---|---|---|
| 45 minute Delay Composition | 4 days Ambient | 10 days 100° F. | 10 days 140° F. |
| Dry pellet density, lb/cu ft | 125 | 127 | 126 |
| Splitting tensile str., lb/sq in | 932 | 1080 | 1170 |
| Attrition resistance, time to reach 60%, sec. | 118 | 238 | 242 |
| Mohs hardness | 4 | 4+ | 4+ |
| Moisture, as cured, % | 6.1 | 9.5 | 8.5 |
| Absorption, % | 9.8 | 9.6 | 8.7 |

The results indicate that the 45 minute delay material could be successfully pelleted. A 27% advantage over immediately pelleted material is observed in early strength; however, the mixes are nearly equal in strength after 10 days of curing.

The effect of mixing time in the Hobart Type N50 mixer was also explored. Starting with a cold pellet mill, 5000 gm batches of the powder sample plus 15% water were mixed in the Hobart mixer for various amounts of time. Other operating variables were the same as described above, and the batches were handled in the same manner as composites from the main run, except that initial testing was at 2 days, and saturation of the remaining pellets was accomplished at that time. Results are shown in Table 6.

TABLE 6

|  | 15 min. Mix | 5 min. Mix | 2 min. Mix | 1 min. Mix | 15 min. Mix |
|---|---|---|---|---|---|
| *2-DAY RESULTS, AMBIENT TEMPS* | | | | | |
| Dry pellet density, lb/cu ft | 125 | 120 | 122 | 124 | 125 |
| Splitting tensile str., lb/sq in | 806 | 779 | 801 | 732 | 890 |
| Attrition resistance, time to reach 60%, sec. | 129 | 103 | 105 | 101 | 137 |
| Mohs hardness | 4 | 3+ | 4 | 4 | 4+ |
| Moisture, as cured, % | 6.5 | — | 7.3 | 7.2 | 6.8 |
| Absorption, % | 8.8 | 10.7 | 10.4 | 8.6 | 9.5 |
| *10-DAY RESULTS, 100° F.* | | | | | |
| Dry pellet density, lb/cu ft | 127 | 122 | 124 | 128 | 123 |
| Splitting tensile str., lb/sq in | 950 | 896 | 1020 | 989 | 939 |
| Attrition resistance, time to reach 60%, sec. | 214 | 197 | 239 | 259 | 240 |
| Mohs hardness | 4+ | 4+ | 4+ | 4+ | 4+ |
| Moisture, as cured, % | 9.5 | 10.7 | 10.2 | 10.5 | 9.5 |
| Absorption, % | 9.6 | 10.9 | 10.7 | 11.0 | 9.6 |
| *10-DAY RESULTS, 140° F.* | | | | | |
| Dry pellet density, lb/cu ft | 126 | 126 | 125 | 125 | 127 |
| Splitting tensile str., lb/sq in | 1120 | 1150 | 1160 | 1110 | 1120 |
| Mohs hardness | 4+ | 4+ | 4+ | 4+ | 4+ |
| Moisture, as cured, % | 8.5 | 9.1 | 9.4 | 8.8 | 8.8 |
| Absorption, % | 8.7 | 9.4 | 9.8 | 9.2 | 9.0 |

Differences in the appearance of the mixed material prior to pelleting were obvious, with the 1 minute material containing many soft lumps at noticeably variable water contents. The 15 minute mix also contained small lumps but was very uniform by comparison. The results show a 22% increase in early strength with increased mixing and a 10% increase in strength at the high degree of mixing in a hot pellet mill as contrasted with the cold (start-up) conditions. These differences in performance are equalized with additional moist curing.

A number of ancillary mixes were also made to demonstrate the ability to make different sized pellets in the Model CL mill. 3/16' pellets were made using a 3/16" diameter × 1" length rifle bore die, ¼" pellets have been described in the earlier part of this Example, ⅜" pellets were made using a ⅜ diameter × 1½" length tapered die; and ½" pellets were made using a ½" diameter × 2" rifle bore die. In all cases, the same two minute mixing procedure as outlined above was used with the Hobart type N50 mixer, and the mixed material was pelletized immediately. Two or three water content levels were utilized with each of the larger pellet sizes to demonstrate the effect of density on performance. The following summarizes the compositions that were evaluated:

|  | Water Added | | |
|---|---|---|---|
| Pellet Diameter | 20% | 17½% | 15% |
| 3/16" | No | Yes | No |
| ¼" | Yes | Yes | Yes |
| ⅜" | No | Yes | Yes |
| ½" | No | Yes | Yes |

The properties and performance of the pellets produced are provided in Tables 7–9; all mixes were tested and saturated at 2 days of age, and sealed containers were used to cure portions of the saturated samples at 100° F. and 140° F.

TABLE 7

2-DAY CURE, AMBIENT TEMPS.

|  | Water Added | | |
|---|---|---|---|
| Pellet Diameter | 20% | 17½% | 15% |
| *Dry Pellet Density, lb/cu ft* | | | |
| 3/16" | — | 116 | — |
| ¼" | 110 | 115 | 124 |
| ⅜" | — | 115 | 121 |
| ½" | — | 118 | 121 |
| *Splitting Tensile Strength, lb/sq in* | | | |
| 3/16" | — | 462 | — |
| ¼" | 334 | 409 | 684 |
| ⅜" | — | 288 | 405 |
| ½" | — | 435 | 532 |
| *Mohs Hardness* | | | |
| 3/16" | — | 4 | — |
| ¼" | 4+ | 3+ | 3+ |
| ⅜" | — | 4 | 4 |
| ½" | — | 4 | 4 |
| *Moisture, as cured, %* | | | |
| 3/16" | — | 10.1 | — |
| ¼" | 10.8 | 10.2 | 7.2 |
| ⅜" | — | 10.1 | 7.5 |
| ½" | — | 9.5 | 7.3 |
| *Absorption, %* | | | |
| 3/16" | — | 13.1 | — |
| ¼" | 14.9 | 12.8 | 9.7 |
| ⅜" | — | 12.2 | 10.5 |
| ½" | — | 11.7 | 10.6 |

TABLE 8

10-DAY CURE, 100° F.

|  | Water Added | | |
|---|---|---|---|
| Pellet Diameter | 20% | 17½% | 15% |
| *Dry Pellet Density, lb/cu ft* | | | |
| 3/16" | — | 122 | — |
| ¼" | — | 116 | 121 |
| ⅜" | — | 117 | 123 |
| ½" | — | 120 | 122 |
| *Splitting Tensile Strength, lb/sq in* | | | |
| 3/16" | — | 1000 | — |
| ¼" | 796 | 794 | 970 |
| ⅜" | — | 544 | 676 |
| ½" | — | 537 | 708 |
| *Mohs Hardness* | | | |
| 3/16" | — | 4+ | — |
| ¼" | 4+ | 4+ | 4+ |
| ⅜" | — | 4+ | 4+ |
| ½" | — | 4+ | 4+ |
| *Moisture, as cured, %* | | | |
| 3/16" | — | 12.4 | — |
| ¼" | 15.8 | 13.4 | 9.9 |
| ⅜" | — | 11.7 | 10.3 |
| ½" | — | 10.2 | 9.3 |
| *Absorption, %* | | | |
| 3/16" | — | 13.0 | — |
| ¼" | 15.8 | 13.8 | 10.3 |
| ⅜" | — | 12.6 | 10.5 |
| ½" | — | 11.2 | 10.3 |

TABLE 9

10-DAY CURE, 140° F.

|  | Water Added | | |
|---|---|---|---|
| Pellet Diameter | 20% | 17½% | 15% |
| *Dry Pellet Density, lb/cu ft* | | | |
| 3/16" | — | 122 | — |
| ¼" | 116 | 121 | 123 |
| ⅜" | — | 118 | 125 |
| ½" | — | 120 | 125 |
| *Splitting Tensile Strength, lb/sq in* | | | |
| 3/16" | — | 1360 | — |

TABLE 9-continued

| | 10-DAY CURE, 140° F. | | |
|---|---|---|---|
| | Water Added | | |
| Pellet Diameter | 20% | 17½% | 15% |
| ¼" | 876 | 1100 | 1200 |
| ⅜" | — | 603 | 700 |
| ½" | — | 602 | 754 |
| Mohs Hardness | | | |
| 3/16" | — | 4+ | — |
| ¼" | 4+ | 4+ | 4+ |
| ⅜" | — | 4+ | 4+ |
| ½" | — | 4+ | 4+ |
| Moisture, as cured, % | | | |
| 3/16" | — | 12.5 | — |
| ¼" | 14.6 | 12.4 | 10.3 |
| ⅜" | — | 10.7 | 9.0 |
| ½" | — | 10.0 | 8.0 |
| Absorption, % | | | |
| 3/16" | — | 12.9 | — |
| ¼" | 15.3 | 12.8 | 10.7 |
| ⅜" | — | 11.2 | 9.4 |
| ½" | — | 10.4 | 8.4 |

The compression factor, based on the two-day pellet densities and a starting bulk powder density of 43.8 lb/cu ft, ranged from 2.5 to 2.8 for the entire series of tests. The results indicate that, although the larger pellets exhibit lower tensile strengths, pellets with good performance properties can be made over a wide range of sizes. Water content is shown to have a significant effect on the pellet densities that are realized in the pellet mill.

All of the pellets described in this Example had good handling properties immediately upon formation of the pellets. There was very limited fines produced; these would normally be recirculated to the pellet mill in a commercial operation. None of the pellets described in this Example exhibited any surface wetting after formation, and no clinkering or sticking together of pellets developed during the curing stages.

In order to demonstrate the immediate handling qualities of the pellets, 500 gms of each of four of the different batches used to evaluate mixing time effects were tested for Pellet Durability Index (PDI) at approximately 1½ to 2 hours after formation. The test device is a standard unit manufactured by Carthage Foundry Co., Carthage, Mo. In this test, the pellets are screened over a No. 5 sieve, then rotated for 5 minutes in a rectangular chamber with internal lifts and rescreened. The PDI is the % retained on the sieve at the completion of the test. Values obtained on the test pellets ranged from 88 to 93% PDI, which is considered acceptable for immediate handling of the pellets.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A process for preparing a dense shaped article, said article comprising fly ash particles bonded together by cementitious reaction products, said process comprising the steps of:
    (a) providing a substantially dry fly ash-containing powder obtained from the dry scrubbing of fly ash-containing flue gas with lime in a spray drying system, said fly ash-containing powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof;
    (b) uniformly contacting said fly ash-containing powder with a predetermined amount of water to produce a powder/water mixture;
    (c) forming said powder/water mixture into a shaped article by confined compaction at a predetermined compactive effort sufficient to provide a handleable green body;
    said predetermined amount of water being selected as at least that amount sufficient to satisfy the short term hydration demands of said powder and further selected in combination with a selected predetermined compactive effort to produce a green body having an uncured dry density in the range of from about 95 to about 140 pounds per cubic foot and wherein the interspatial voids between the fly ash particles in said green body are sufficient to accommodate the subsequently formed cementitious reaction products without deleterious expansion of the article; and
    (d) curing said green body product in a moist atmosphere to form a shaped article bonded by said cementitious reaction products.

2. A process for preparing a dense shaped article, said article comprising a composite material containing fly ash particles bonded together by cementitious reaction products, said composite material having a splitting tensile strength of at least about 200 psi, said process comprising the steps of:
    (a) providing a substantially dry fly ash-containing powder obtained from the dry scrubbing of fly ash-containing flue gas with lime in a spray drying system, said fly ash-containing powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof;
    (b) uniformly contacting said fly ash-containing powder with from about 4 to about 20% by weight of water;
    (c) forming said powder/water mixture into a shaped article by confined compaction at a compaction ratio of from about 2 to 3 to provide a handleable green body;
    said water being added in an amount sufficient to satisfy the short term hydration demands of said powder and further in an amount which in combination with the selected compaction ratio is sufficient to produce a green body having an uncured dry density in the range of from about 95 to about 140 pounds per cubic foot and wherein the interspatial voids between the fly ash particles in said green body are sufficient to accommodate the subsequently formed cementitious reaction products without deleterious expansion of the article; and
    (d) curing said green body product in a moist atmosphere to form a shaped article bonded by said cementitious reaction products.

3. A process for preparing a dense shaped pellet having a splitting tensile strength of at least about 200 psi, said process comprising the steps of:

(a) providing a substantially dry fly ash-containing powder obtained from a flue gas desulfurization operation in which fly ash-containing flue gas is scrubbed with an aqueous lime suspension in a spray dryer, said powder comprising fly-ash particles coated with microparticulate crystallites of scrubber reaction materials selected from the group consisting of calcium sulfite, calcium sulfate, hydrates of calcium sulfite and calcium sulfate, calcium oxide, calcium hydroxide and mixtures thereof;

(b) adding from about 4 to about 20% by weight of water to said fly ash-containing powder;

(c) uniformly distributing said added water throughout said powder;

(d) rapidly forming the resulting uniform powder/water mixture into pellets in a high energy extrusion type pelletizing mill operated at compaction ratios sufficient to provide a handleable green pellet having a dry uncured density of from about 95 to about 140 pounds per cubic foot and wherein the interspatial voids between the fly ash particles in said green pellet are sufficient to accommodate the subsequently formed cementitious reaction products without deleterious expansion of the article; and (e) curing said green pellets in a moist atmosphere to allow said cementitious reaction products to form.

4. The process of claim 1, 2 or 3 wherein said dry fly ash-containing powder is recovered directly from the outlet of the spray dryer.

5. The process of claim 1, 2 or 3 wherein said dry fly ash-containing powder is recovered from a particulate removal device downstream of the spray dryer.

6. The process of claim 5 wherein said particulate removal device is a bag house.

7. The process of claim 5 wherein said particulate removal device is an electrostatic precipitator.

8. The process of claims 1, 2, or 3 wherein said dry fly ash-containing powder is conditioned by heating to obtain maximum latent cementitious activity.

9. The process of claim 8 wherein said heating is performed separately from said scrubbing and at a temperature of from about 120° to about 350° C.

10. The process of claim 1 wherein said predetermined amount of water comprises from about 4 to about 20% by weight based on said dry powder.

11. The process of claims 1, 2 or 3 wherein said water is sprayed on said powder while said powder is being tumbled.

12. The process of claims 1 or 2 wherein said compacting is effected in a press.

13. The process of claims 1 or 2 wherein said compacting is effected in a high speed extrusion type pellet mill.

14. The process of claim 13 wherein said predetermined amount of water comprises from about 10 to about 20% by weight based on said dry powder.

15. The process of claim 1 wherein said powder is compacted at a compaction ratio of from about 2 to about 3.

16. The process of claims 1, 2, or 3 wherein said green body is cured at about 100° F. for a period of at least about 10 days.

17. The process of claims 1, 2 or 3 wherein said green body is cured at about 120° to about 180° F. for a period of about 2 days.

18. A dense hardened cementitiously bonded shaped article made from a composite material which comprises a fly ash-containing powder obtained by a flue gas desulfurization operation using a spray drying system, said powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof, said composite material exhibiting a splitting tensile strength of at least about 300 psi and a cured dry density of from about 95 to about 140 pounds per cubic foot.

19. The article of claim 18 in the shape of a pellet suitable for use as a gravel substitute.

20. The article of claim 18 in the shape of a structural building product.

21. The article of claim 20 wherein said structural building product is a brick.

22. The article of claim 20 wherein said structural building product is a block.

23. The process of claim 1, 2 or 3 wherein said fly ash-containing powder additionally contains a binder.

24. The process of claim 23 wherein said binder is Portland Cement.

25. The shaped article of claim 18 wherein said fly ash-containing powder additionally contains a binder.

26. The shaped article of claim 25 wherein said binder is Portland Cement.

* * * * *